April 12, 1955     P. H. KORSGAARD     2,706,165
SEALING METHOD
Filed May 14, 1953
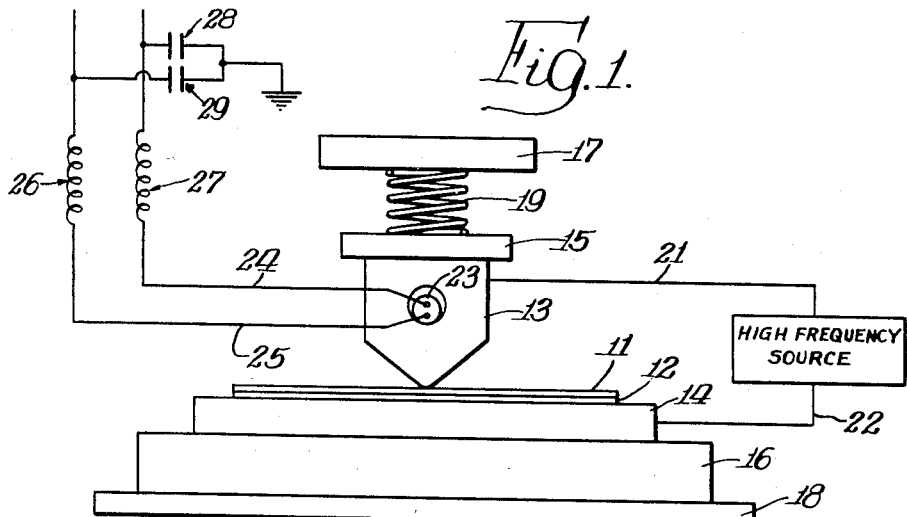
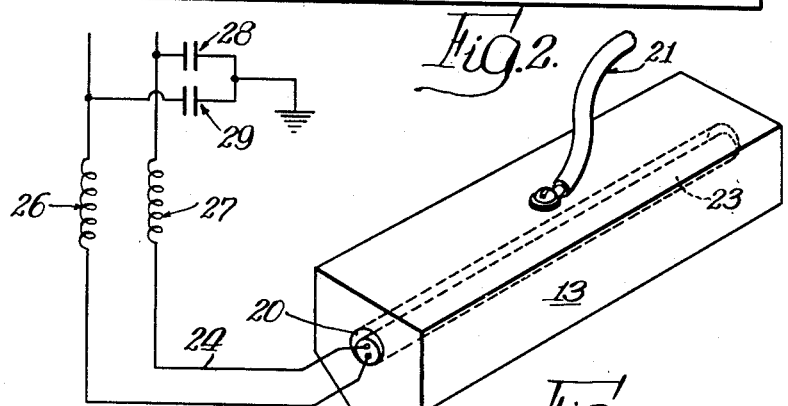
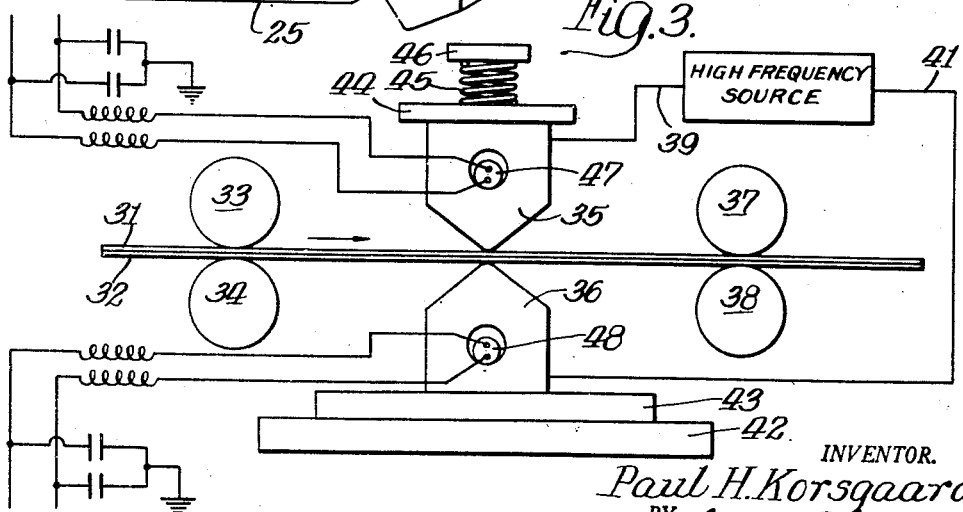
INVENTOR.
Paul H. Korsgaard,
BY United States Patent Office 2,706,165
Patented Apr. 12, 1955

2,706,165

SEALING METHOD

Paul H. Korsgaard, New Lenox, Ill., assignor to Tee-Pak, Inc., a corporation of Illinois Application May 14, 1953, Serial No. 354,950

3 Claims. (Cl. 154—126.5)

This invention relates to improvements in the dielectric sealing of thermoplastic films.

As is well known in the art there are certain thermoplastic films which cannot be satisfactorily heat sealed or "welded" by the use of a heated bar, either because of the sharp melting point of the thermoplastic film which requires such a high degree of control of the sealing bar temperature as to make such control impractical, or because of deformation of the film due to shrinkage in the portion of the film which is adjacent to the seal.

The above disadvantages are present concurrently when the thermoplastic film to be sealed is a highly oriented one such as Saran (vinylidene chloride-vinyl chloride copolymer), oriented Pliofilm (rubber hydrochloride), and the like. Because of the high degree of sensitivity of these films to heat sealing, they are commonly sealed by "dielectric sealing," namely by using cold bars as electrodes for application of a high frequency field to a restricted portion of the film, and developing heat therein by dielectric loss. The relatively cold electrodes then chill the heated portion upon removal of the high frequency field while retaining it under pressure to restrain the film from shrinkage along the seal line. With "dielectric sealing" the amount of energy can be closely controlled to provide the exact amount of heat necessary to produce a seal, since there is no such appreciable lag in the temperature of the bar as when a heated bar is used to supply the energy to the seal by conduction.

However, though "dielectric sealing" of thermoplastic film is generally superior to sealing methods involving the use of heated electrodes, wherein the electrodes are heated to at least the sealing temperature of the film to be sealed, it is not without certain disadvantages of its own, among which might be mentioned higher power cost and limitations of electrode performance as exhibited by arcing across the electrodes with resultant imperfections in the seal being made.

Accordingly, one of the objects of my invention is to provide an improved means for effecting dielectric sealing of thermoplastic film.

Another object is to provide an improved electrode for use in dielectric sealing of thermoplastic film.

A further object is to provide an improved method of dielectric sealing of thermoplastic film.

The invention will be clearly understood by reference to the following description and drawing wherein:

Figure 1 is a schematic diagram showing one arrangement of equipment for practicing the invention;

Figure 2 is a perspective showing of one of the electrodes shown in Figure 1; and Figure 3 shows another arrangement of equipment for practicing the invention.

Referring to Figure 1, 11 and 12 represent sheets of thermoplastic film being sealed, 13 and 14 are electrodes and 15 and 16 represent insulators insulating the electrodes 13 and 14 from members 17 and 18. The schematically shown spring 19 serves to maintain the electrodes in pressure relationship, as required, with the film 11 and 12. High-frequency current is supplied the electrodes 13 and 14 through leads 21 and 22, at such frequency and voltage as may be required. A resistance heater 23 is heated by current through leads 24 and 25, to maintain the temperature of electrode at a temperature substantially higher than ambient. In the case of Saran film a seal between two sheets of the film is effected by use of a frequency of 40 megacycles per second, and a potential of 1000 volts, for 0.2 second.

In operation, with the plastic films 11 and 12 positioned as shown, electrode 13 is moved downwardly so that the leading edge thereof presses against the film 11, and a high frequency current is applied to electrodes 13 and 14, from the source thereof for a time sufficient to effect a sealing of the film. The films 11 and 12 are then moved or removed and the cycle repeated.

Referring to Figure 2, the copper electrode 13 is heated by means of a conventional resistance heater 23 positioned within an aperture 20 in the electrode 13. Leads 24 and 25 connect the resistance heater 23 to a source of low frequency current, e. g. a 110 volt, 60 cycle line; a conventional high frequency filter comprised of inductance coils 26 and 27 and capacitors 28 and 29, on the leads 24 and 25 serves to prevent high frequency current from backing up in the 110 volt line by presenting a high impedance to the impressed high frequency voltage and at the same time a low impedance to the low frequency voltage. The heater 23 is designed to heat the electrode 13 to a temperature which may be 200° F.–300° F. or higher, but below the sealing temperature of the film being sealed. The temperature of the heater may be controlled by regulating the applied low frequency voltage to the proper value by a conventional rheostat, auto transformer, or other controller, not shown.

Figure 3 shows another embodiment of an arrangement for the dielectric sealing of two sheets of superimposed film 31 and 32. As shown a film pair composed of films 31 and 32 passes between the rollers 33 and 34, between electrodes 35 and 36 and then between rolls 37 and 38. The movement of the film is synchronized with the vertical movement of the electrode 35 so that the film is not in motion when the electrode 35 is in a contacting position with the film. At such time, i. e. when electrode 35 is in a down position, the high frequency current is applied across the electrodes from the source shown for a time sufficient to effect a seal at the line of contact between the electrodes 35 and 36 and the film. The current from the high frequency source is applied by way of leads 39 and 41. The electrode 36 is positioned on the base 42 and separated therefrom by means of an insulating layer 43 of suitable, conventional construction. The movable electrode 35 is secured to insulator 44 the latter being in engaging contact with the spring 45 and a base 46 with means, not shown, for effecting vertical movement of the electrode 35 against the spring 45. Resistance heaters 47 and 48 are heated in the same manner as shown in Figure 1, and, as there, serve to maintain the temperature of the electrodes 35 and 36 at the required temperature, namely below the sealing temperature of the film being sealed but substantially higher than ambient temperatures.

The present invention proceeds from applicant's observations that a conventional dielectric sealing machine—e. g. one such as is shown schematically in Figure 1 except that electrode 13 was not adapted, as it is here, for being heated—in use over a period of time resulted in a slow rise in temperature of the electrode bars, due to conduction of the heat from the thermoplastic film to the bar during the chilling portion of the cycle after the seal had been made. The temperature rise was of the order of 20° F., at which temperature differential an equilibrium in the heat dissipation and the heat absorption was apparently reached. It was also observed that as the temperature of the bar increased the quantity of high frequency energy required decreased somewhat, necessitating a decrease in the power input in order to avoid overheating the seal. It was noted further that the uniformity of the seal progressively improved.

The applicant then made up a copper electrode bar as shown in Figure 1 and 2 having a hole therethrough as shown and inserted a resistance heater in the electrode to raise its temperature. The energy supplying this heater is fed through a high frequency filter which permits passage of 60 cycle heating current but not the passage of high frequency energy, which is of course separately applied to the bar. If desired, temperature controls can be mounted directly on the bar, or if desired thermocopule leads to a controller may be taken from the bar through a similar high frequency filter.

The purpose of the electrical resistance heater in the bar is so that the temperature of the bar can be increased although still depending on the high frequency impulse to supply the major part of the energy for the seal. It was found that the temperature of the bar could be raised to 300° F. or even higher, the only temperature requirement being that it be below the sealing temperature of the film. Surprisingly, it was found that deformation of the seal, such as occurs where a seal is made by a conventional hot bar at a temperature above the sealing temperature of the film, does not occur even though the electrode is heated to a temperature approaching closely to the sealing temperature of the film. Practical temperature ranges I have found are between 200° F. and 300° F. A high frequency energy impulse is still required, as mentioned above, to produce the seal. At such temperatures, namely 200° F.–300° F. however, the amount of high frequency energy required is reduced substantially, for example to as little as 50% of that required using a cold electrode. Furthermore, it has been found that the uniformity of the seals is tremendously improved. The precise temperature to which the electrode bar is raised is not particularly critical—provided only that it be below the melting point of the film being sealed—so that ordinary means of temperature control known to the art are adequate.

Among the advantages of my invention may be mentioned the drastic reduction in high frequency power requirements which allows the use of a smaller high frequency generator. Since the efficiency of high frequency generators in bringing the power to the point of use is comparatively low, the effective cost per unit of power delivered to the load is very much higher for high frequency energy than for ordinary low frequency energy. Therefore a partial substitution of the cheaper, low frequency heating power for the high frequency power results in considerably lower operating costs. A further advantage is that arcing and voltage break down, characteristic of the process, is substantially decreased. Furthermore, with the present invention it is possible to operate at lower high frequency voltage, thus allowing higher speeds and/or greater freedom from voltage breakdown.

While I have described an embodiment of my invention wherein the sealing electrodes are heated by means of a resistance heater inserted therein, it is of course clear that any other means of heating the electrode can be used to raise the electrode temperature to well above the ambient temperature.

Other variations in details will readily occur to those skilled in that art, and, accordingly it is understood that the described embodiments are illustrative only and not to be construed in a limiting sense.

I claim:

1. The method for sealing thermoplastic film which comprises applying a high frequency current to a film selected from the group consisting of vinylidene chloride-vinyl chloride copolymer film and oriented rubber hydrochloride film, while said film is in engaging contact with electrodes, with at least one of said electrodes being heated to a temperature between about 200° F. and 300° F. and above the heat distortion temperature of the film.

2. A method for sealing thermoplastic sheets which comprises applying a high frequency current to sheets selected from the group consisting of vinylidene chloride-vinyl chloride sheets and oriented rubber hydrochloride sheets, said sheets being in engaging contact with a pair of electrodes, at least one of said electrodes being at a temperature between about 200° F. and 300° F. and above the heat distortion temperature of the sheets but below the sealing temperature of the thermoplastic sheet material.

3. In the process of heat-sealing thermoplastic film wherein thermoplastic film selected from the group consisting of vinylidene chloride-vinyl chloride copolymer film and oriented rubber hydrochloride film is subjected to high frequency dielectric current for a time sufficient to effect a seal, the improvement which comprises the step of effecting such seal while the film is in contact with an electrode whose temperature is about 200° F. and 300° F. and above the heat distortion temperature of the film but below the melting point of the thermoplastic sheet.

References Cited in the file of this patent
UNITED STATES PATENTS
2,457,659   Graham et al. _____ Dec. 28, 1948